(12) United States Patent
Sievers et al.

(10) Patent No.: US 7,278,300 B2
(45) Date of Patent: Oct. 9, 2007

(54) GAS FILLED REACTIVE ATOMIC FORCE MICROSCOPE PROBE

(75) Inventors: Michael R. Sievers, Poughkeepsie, NY (US); Siddhartha Panda, Beacon, NY (US); Richard Wise, New Windsor, NY (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 11/162,958

(22) Filed: Sep. 29, 2005

(65) Prior Publication Data

US 2007/0068234 A1     Mar. 29, 2007

(51) Int. Cl.
*G01B 5/28* (2006.01)
(52) U.S. Cl. ........................................ 73/105
(58) Field of Classification Search ............... 73/105
See application file for complete search history.

(56) References Cited

U.S. PATENT DOCUMENTS

| | | | |
|---|---|---|---|
| 5,025,658 A | 6/1991 | Elings et al. | |
| 5,262,643 A | 11/1993 | Hammond et al. | |
| 6,337,479 B1 * | 1/2002 | Kley | 250/234 |
| 6,690,008 B2 | 2/2004 | Hantschel et al. | |

\* cited by examiner

*Primary Examiner*—Daniel S. Larkin
(74) *Attorney, Agent, or Firm*—H. Daniel Schnurmann

(57) ABSTRACT

An atomic force microscope (AFM) having a hollowed cantilever ending in a hollowed tip is described, wherein the end of the tip is immersed in a liquid. The AFM includes a gas source that provides and controls the flow of gas into the hollowed tip. The flow rate of the gas is regulated to form and sustain a static bubble at the end of the hollowed tip. The formation of the static bubble is verified optically. A gas control manifold allows an easy switch of gasses that are fed into the probe tip. The gas that is introduced acts like a chemically modified tip, and is selected to increase the deflection signal for the material of interest. The tip of the present invention is a highly versatile AFM tool that is easily adjusted to provide optimized imaging for a wide variety of materials, in contrast with standard AFMs that require a plethora of chemically modified tips to obtain equivalent results. Moreover, there is a much lower propensity for the tip to damage the sample or to be damaged from inadvertent contact with the surface of the sample.

20 Claims, 4 Drawing Sheets

GAS FILLED REACTIVE ATOMIC FORCE MICROSCOPE PROBE

BACKGROUND OF THE INVENTION

The invention is generally related to an atomic force microscope probe, and more particularly to an AFM probe terminated in a chemically modified tip to amplify forces exerted on the tip due to a stronger attractive or repulsive force between the tip and the surface of a sample.

Atomic force microscopy is extensively used in microelectronics as a characterization tool. Atomic force microscopes (hereinafter AFM) are essentially surface profilometers which use sharp tips and very low forces between the tip and the sample. They also operate in a mode in which the force is attractive and the tip does not touch the surface. Typically, in the microscope, a sharp tip is placed on a flexible lever in contact with the surface. The height of the tip is detected by the tunneling microscope, and this height measurement is used in a feedback loop to move the lever up and down to keep the bending of the lever, and therefore the force on the sample to remain constant.

A prior art representation of an AFM probe is shown in FIG. 1. The AFM cantilever 102 is positioned very close to the surface 103 and is rastered by an x,y translator. During this rastering process, the deflection of the tip of the AFM is detected by means of an interferometric detector 101. With this setup, the tip can be placed directly in contact with the surface (contact mode) or can be placed at a position where the attractive forces between the tip and the surface are at a maximum (non-contact mode).

AFMs generally provide high resolution information about surface contours. Vertical movement of the sensing probe in response to a raster scanning procedure of the sensing probe across the target surface is used for determining the target surface contour. The implementation of the AFM devices is based on the interaction of forces that include atomic, electrical potential, magnetic, capacitive or chemical potential to maintain a constant probe to target surface gap or distance.

In addition to imaging surface contours, AFMs are also used to measure a variety of physical or chemical properties with detail over a range from a few Angstroms to hundreds of microns. For these applications, AFMs provide a lateral and vertical resolution that is not obtainable from any type of device. Examples of applications include imaging or measuring the contour properties of transistors, silicon chips, disk surfaces, crystal, cells and the like.

Generally, in order to provide for an optimal operation of the AFM, the scanning probe is positioned over the target surface at a distance within the same order of magnitude as molecular geometries. That is, a distance of one or two atoms, or an order of magnitude of tens of Angstroms.

Standard atomic force microscopy relies on the hard sphere interactions between a very small probe tip with the sample to be analyzed. The two common AFM modes of operation are contact and non-contact mode. In a contact mode, the tip is in direct contact with the surface while in the non-contact mode the tip remains within nanometers of the sample. The AFM tip brought to within nanometer distances of the surface and scanned in an x,y translational stage, changes in the tip position in the z-direction generates an interaction between the tip and the surface that induces a deflection which is sensed and measured by an interferometric detector. This mode of operation will be referred hereinafter as a 'non-contact mode'.

In contrast, when the top contacts the surface and rides across the surface, the surface morphologies induce deflection of the tip which is sensed by the detector, as previously stated and which will be referred hereinafter as a 'contact mode'. There are two main interactions that occur between the tip and the surface. One interaction is repulsive and the other is attractive. The repulsive force increases as the tip approaches the surface. This force can be explained by the hard sphere repulsions of the tip and the surface. The attractive force is due to a van der Waals type attraction between two species.

To increase the sensitivity between different species that may exist on the sample to be analyzed, probe tips have been manufactured that enhance the interaction between the tip and that material. These tips fall under the general classification of Chemically Modified AFM Tips. They are generally made in many different ways but the net result is that the chemical modification allows for better differentiation between two materials that appear to be the same under normal AFM imaging. In spite of its versatility, the amplification of a signal is achieved only on a small range of materials. Moreover, when different materials are imaged, different tip coatings are typically required. The problem is compounded by the fact that AFM tips are easily damaged due to the close proximity of the tip to the surface of the sample. Since tips are expensive, the cost of replacement becomes significant.

The goal for any imaging technique is to be able to image materials with a greater signal to noise ratio. Regarding AFM imaging, it is known that in order to increase the signal to noise ratio, chemically modified tips are preferably used to amplify the forces exerted on the tip due to stronger attractive or repulsive forces between the tip and the surface of the sample. Chemical modified tips are selected to provide certain functional groups to the end of the tip in order to accentuate the interaction between the tip and the sample. If the functional groups on the surface that is to be analyzed are polar in nature, applying a coating on a tip that is polar will be more beneficial than a non-polar functional group. If the material at the surface changes, the degree of enhancement given by the modification may or may not assist in giving an acceptable image. To attain a higher degree of image quality, quite possibly a new tip with a different tip modification would have to be needed. This becomes costly when the analyst has to routinely handle a wide range of materials.

Moreover, two problems exist with AFM and chemically modified AFM tips. One problem is that since the tips traverse the sample at a very close range, and the potential for the tip to hit the surface and damage the tip and possibly the surface is real. If the tip is significantly damaged, it needs to be replaced because the imaging quality will degrade. Another problem is directly related to the localized benefit that one achieves with chemically modified AFM tips. The tips are modified to increase the sensitivity to small amounts of materials. Basically, amplification is only achieved with materials that have similar chemical characteristics. If a new material that does not fall in that region is to be imaged, a new AFM tip needs to be created or purchased. To create the tip is not a trivial operation and the cost of the new AFM tip is significant, even if one actually exists.

A typical force for a standard AFM is an attractive van der Waals ($R^{-6}$) force when it operates in a non-contact mode. The repulsive ($R^{-12}$) force, on the other hand, is of the order of ($R^{-12}$) when in contact mode. It has been determined that a chemical modification has the potential of contributing an additional ($R^{-4}$) force to the stated interaction.

Referring now to FIG. 2, there is shown a plot of the arbitrary energy as a function of the distance between species. As two objects approach each other, an attractive $R^{-6}$ potential exerts an attractive force between the objects. This attractive force increases as the distance decreases. When the distance becomes sufficiently small, a repulsive hard sphere potential with a radial dependence of $R^{-12}$ exerts a repulsive force between the objects. In a real situation, the attractive force continues to draw the objects together up to a maximum force shown as the bottom of the curve. At this point, the repulsive potential starts to dampen the attractive force. If the attractive force had a stronger radial dependence, for instance, $R^{-4}$, then the attractive force at the bottom of the curve will increase significantly. This increased force will generate a much larger deflection of the AFM tip which will be noted strongly by the interferometric detector. This enhanced deflection also gives a better signal to noise ratio since the signal is amplified and the noise remains the same, the noise being, of course, strongly dependent on the interferometer and not on the tip.

OBJECTS AND SUMMARY OF THE INVENTION

Accordingly, it is an object of the invention to provide an AFM probe terminated in a chemically modified tip to amplify forces exerted on the tip due to stronger attractive or repulsive forces between the tip and the surface of a sample.

It is another object to increase the versatility of the AFM probe by switching gases to enhance the amplification of the signals on an expanded variety of materials.

It is a further object to enhance the signals obtained from a higher attractive force wherein the contact area between the tip and the surface is significantly reduced by way of an expanding gas bubble.

It is still another object of the invention to create an added $(R^{-4})$ force to the stated interaction that is contributed by the chemical modification.

The invention provides an AFM having a hollowed flexible lever ending in a hollowed tip, the end of the tip being immersed in a liquid, the AFM including a gas source that provides and controls the flow of gas into the hollowed tip. The gas is preferably non-reactive to the liquid. The flow rate of gas is regulated to form and sustain an expanding bubble at the end of the hollowed tip.

The bubble positioned at the end of the tip generates AFM images with a significantly improved signal to noise ratio. The tip allows switching gasses with changing samples. Such an apparatus is highly cost effective since changing a gas is less expensive than replacing the probe. Moreover, since the closest part of the probe that can possibly contact the surface is a gas, the possibility of probe damage decreases significantly.

The invention requires that scanning be done in a liquid that does not appreciably dissolve the gas. The AFM probe and the sample are immersed in the liquid and then the gas is introduced into the hollow AFM probe. The rate of the gas flow into the probe is then adjusted so that a small expanding bubble forms at the end of the tip. The bubble is confirmed optically. At this point, standard AFM non-contact scanning methodologies will then the image the surface. The AFM tip thus described is modified to suit any material that needs imaging. This is accomplished by using any standard AFM platform and a hollow tip AFM probe.

With this setup, a gas control manifold allows an easy switching of gasses that are fed into the probe tip. The gas that is introduced is selected so as to increase the deflection signal for the material of interest. In essence, the gas acts like a chemically modified tip. The advantages gained from such a setup are as follows:

First, the tip of the present invention is a highly versatile AFM tool that is easily adjusted to provide optimized imaging for a wide variety of materials, in contrast with standard AFMs that require a plethora of chemically modified tips to obtain equivalent results.

Secondly, there is a much lower propensity for the tip to damage the sample or to be damaged from inadvertent contact with the surface.

The foregoing discussion has outlined rather broadly the features and technical advantages of the present invention in order for the detailed description of the invention that follows to be better understood.

BRIEF DESCRIPTION OF THE FIGURES

These and other objects, aspects and advantages of the invention will be better understood from the detailed preferred embodiment of the invention when taken in conjunction with the accompanying drawings.

DETAILED DESCRIPTION

Figure 3:
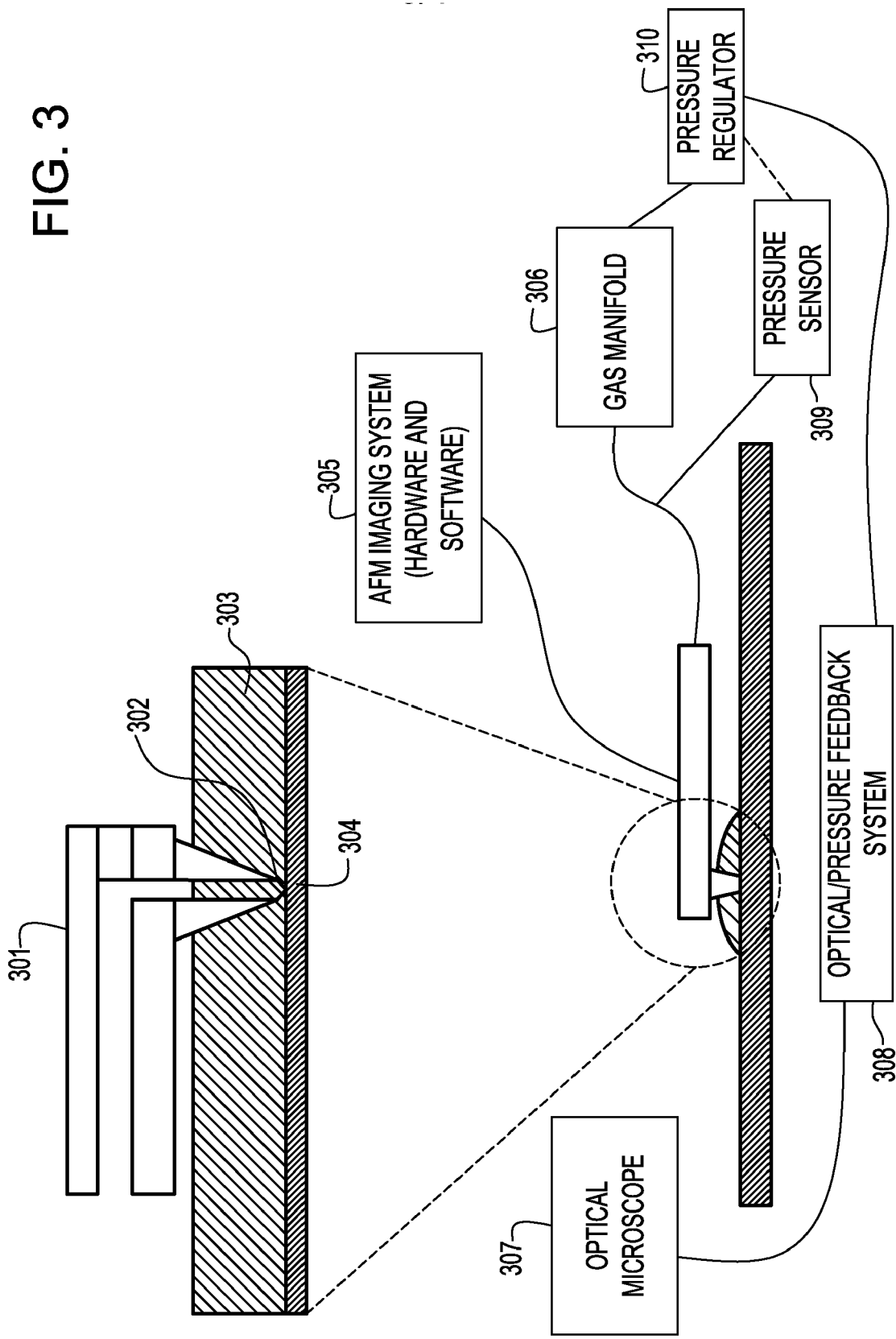
FIG. 3 shows a schematic diagram of the hollow tip AFM filled with inert gas, in accordance with the present invention.
Figure 4:
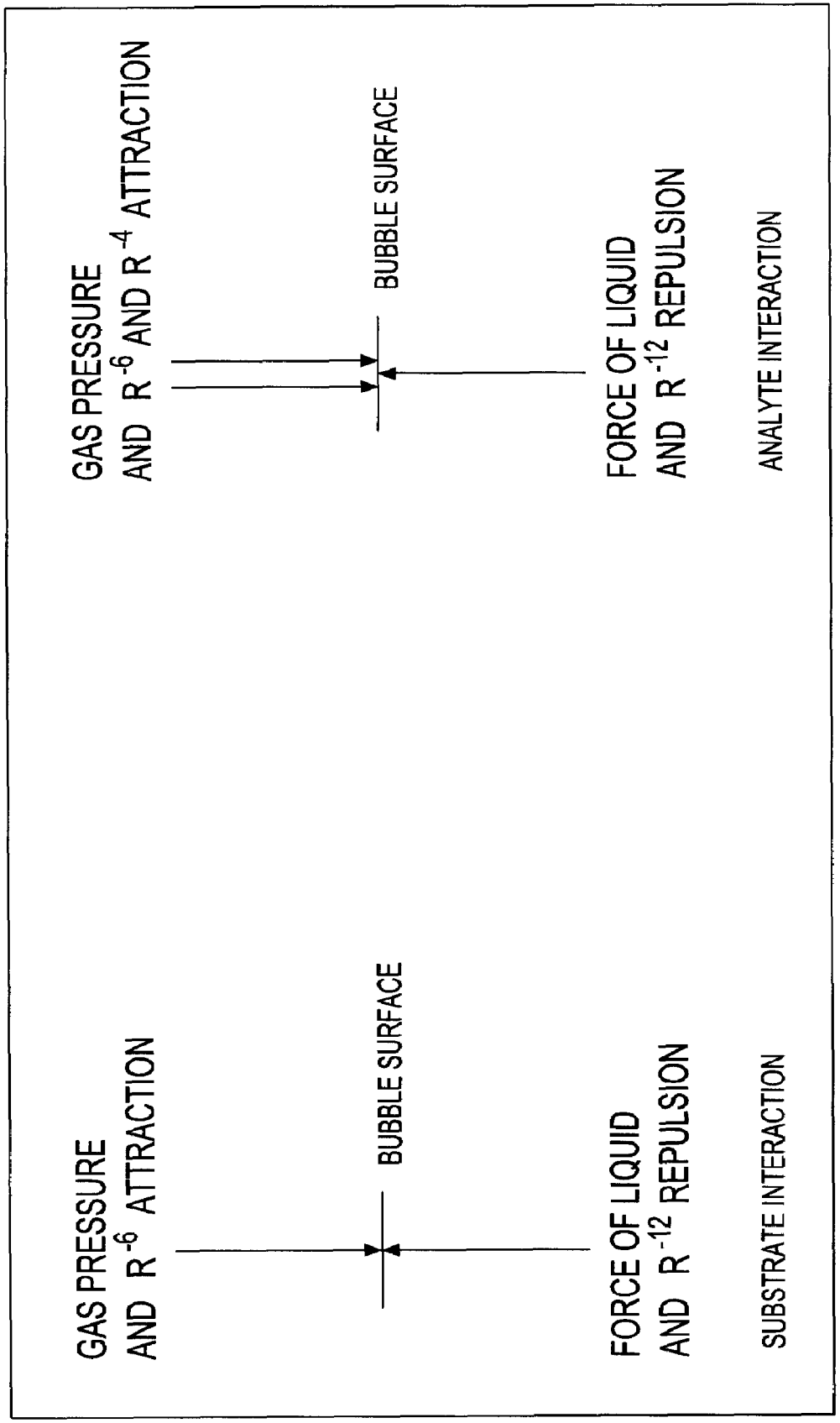
FIG. 4 is a free body diagram of the bubble surface illustrating the overall force that exists between the tip and the surface of the sample.

Referring now to FIG. 3, there is shown a schematic diagram of a hollow-tip AFM filled with inert gas, in accordance with the present invention. A thin film of inert liquid 303 is placed on the surface of the sample 304. The hollow tip AFM probe 301 is then inserted into the liquid and positioned in close proximity to the surface. A gas manifold 306 connected to this probe then regulates a gas source to produce an expanding gas bubble 302 at the end of the AFM tip. The existence of the bubble to be verified optically will be described hereinafter.

To maintain the shape and the expanding nature of the bubble, a pressure and/or optical imaging feedback system can be advantageously used. As soon as the bubble is generated, a pressure sensor near the gas manifold is set to monitor any variation of the gas pressure on the tip since it is directly related to modulations of the pressure near the manifold. If variations of the pressure occur, the output from the pressure sensor can either open or close the flow controller to the manifold to correct for these variations.

Another method for monitoring the expanding nature of the bubble is by performing an optical imaging scanning of the bubble through the optical microscope 307 that is generally integrated in most AFM instruments. As soon as the operator is satisfied with the bubble shape and position, the operator can instruct the tool that from that point of the scanning process and onward to periodically take optical images of the bubble. A comparison then can be made with the original image obtained before scanning begins. If the variation is unacceptable, corrections can be made to several of the scanning parameters or pressure parameters to bring the bubble shape back to coincide with the original reference image.

Still another variable can be introduced to maintain the bubble expanding by adjusting the bubble position relative to the bottom of the AFM tip. If it becomes too difficult to maintain the bubble expanding as rastering begins, the bubble can be moved further into the tip which will reduce the effects of the liquid shear forces on the bubble surface.

As the AFM tip approaches the surface an attractive potential between the tip and the surface induces an attractive force that causes the AFM flexible lever, e.g., a cantilever, to bend towards the surface. This attraction can be described by way of a Lennard Jones potential (LJP). For non-reactive interactions between the tip and surface, the potential between the tip and surface generates an attractive force that shows an $R^{-6}$ dependence on the distance between the tip and surface R. This force is due to van der Waals attractions that exist between two particles. With a decreasing distance, the attraction becomes progressively stronger. As the distance between the tip and the surface starts approaching the topology of the surface, an even stronger repulsive force starts effecting the deflection of the AFM tip. This force shows an $R^{-12}$ repulsive dependence and it is a result of the hard sphere repulsions between the atoms of the tip and atoms on the surface.

Figure 1:
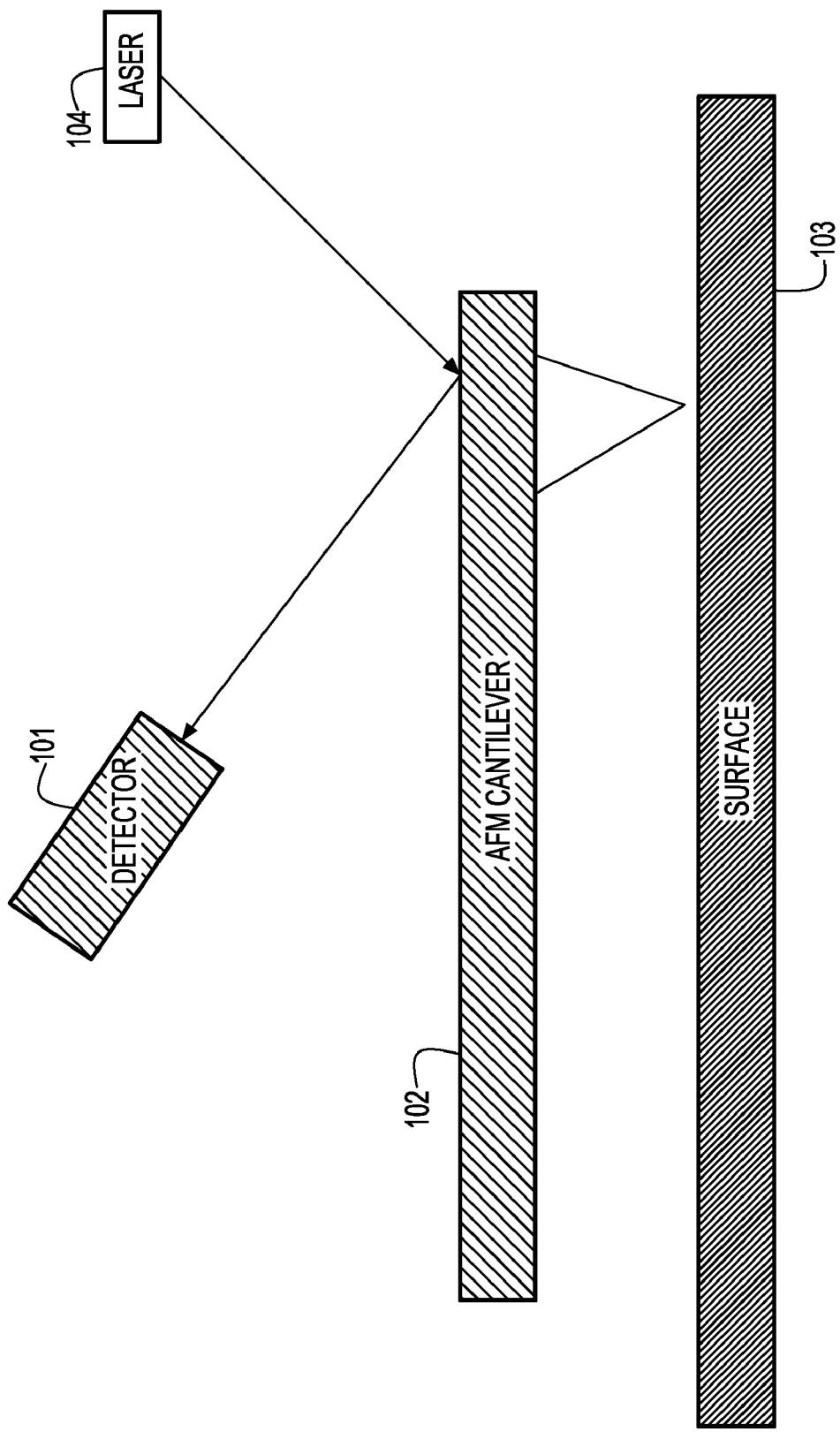
FIG. 1 is a schematic diagram illustrating a prior art AFM cantilever probe.
Figure 2:
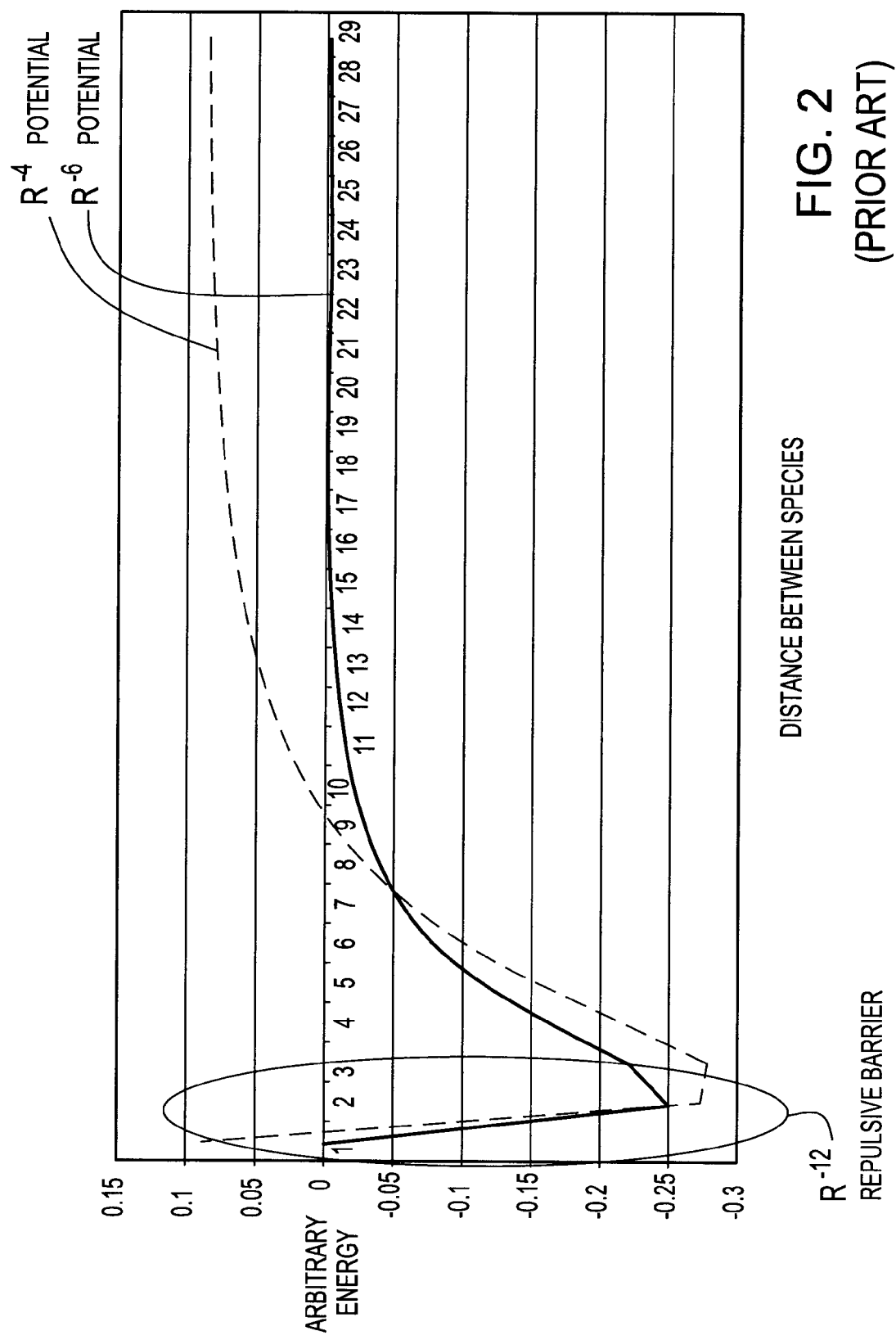
FIG. 2 shows a plot of the arbitrary energy as a function of the distance between species.

The overall force that exists between the tip and the surface is illustrated in FIG. 2. The maximum attractive force is shown as the lowest point of the curve (i.e., labeled $R^{-12}$ Repulsive Barrier). For a non-contact mode AFM, the distance, $R_{max}$ is the ideal distance for the method of the present invention since a maximum signal deflection is necessary. With the greater signal deflection, there are two strong benefits that are gained. One is a much improved signal to noise ratio, which was discussed in greater detail earlier, and the other is a significant reduction of the probability of the tip being damaged.

If the tip and the surface had a greater attractive potential between them, the attractive force would be stronger and would be characterized by a potential having an $R^{-4}$ dependence. A stronger potential between the tip and surface can be induced by creating an environment that is more advantageous than a van der Waals force. Typical examples of these types of interactions are an ion-induced dipole, a dipole-dipole, and the like.

With the stronger interactions, the maximum strength of the force between tip and surface is greater than that of a non-reactive system. Another difference is the position of the maximum attractive force. The stronger interaction also allows obtaining an equivalent deflection of the AFM tip but at a larger separation between the tip and the surface. For greater distances, it reduces the probability of the tip being damaged or the tip damaging the surface.

Chemically modified AFM (CAFM) tips exploit the increased interaction by having the tip surface potential become stronger than that of a simple $R^{-6}$ potential. One example is by attaching groups at the end of the tip that terminate in a hydroxyl (—OH) group. Since the hydroxyl group is a permanent dipole, it allows a potential hydrogen bonding and, likewise, any of the dipole-material interactions thereof which are created. This capability enhances the interaction of the tip with materials that are coordinated by way of the hydroxyl group. Groups on the surface that cannot interact with the hydroxyl group still display the $R^{-6}$ attraction, as the tip traverses them.

Chemically modified tips though have certain limitations. As materials change, the degree of enhancement that one obtains from stronger potentials is reduced. An ideal CAFM tip consists of one that is tuned to show optimum deflection for each of a variety of materials that are to be imaged. The invention achieves this by way of the hollow AFM probe filled with gas that is attracted to the material of interest.

Using hollow tip AFM probes is known in the art. By way of example, in U.S. Pat. No. 5,395,741 to Marchman, there is described an apparatus for delivering in a localized fashion a reactive gas to a surface to induce localized etching. Also discussed are various AFM tip geometries that are capable of handling gasses that require assistance in the form of localized heating or of an electric field to force a reaction to occur.

The fundamental reason why a reaction between two species takes place is based on the attractive potential between the species that causes them to move closer to one another. This potential that creates the reaction is similar to the potential that is used to increase the deflection in CAFM tips. When samples are imaged, a chemical reaction occurring between the tip and surface is not desirable. Therefore, preventing a chemical reaction from occurring is a top concern. One way of preventing this is by having an inert material that does not permit the species to diffuse towards each other more than the amount that the AFM operator can control, that being the tip-surface distance R. A classic example of an inert material includes mineral oil, but there exists a large variety of materials that can be used to segregate the active tip gas from the surface.

To utilize the increase in deflection that is gained from the gas, the following steps are preferably followed.

First, the sample is prepped for analysis and a drop of the inert fluid 303 that is compatible with the gas of interest is dispensed over the sample to be analyzed. The hollow AFM probe 301 is then slowly inserted into the liquid. As soon as the end of the tip immersed in the liquid is optically verified, the vertical motion towards the surface is brought to a stop. Next, by way of a gas manifold 306, a pressure regulator is carefully adjusted in order to allow the gas to slowly start flowing into the tip. The tip is monitored by an optical microscope, which is standard in most AFMs. When the force of the gas pressure in the tip approaches the force exerted on the tip by the atmospheric pressure, the operator detects the gas-liquid interface move towards the end of the tip. Ideally, the pressure is to be regulated to create an expanding bubble 302 at the end of the tip. When the bubble is formed, the tip is very slowly moved towards the surface using standard non-contact AFM methodology. When the maximum force distance between tip and surface is achieved, the tip is adjusted to that position. From that point and forward, standard AFM methods can be used to image the surface.

To maintain the pressure in the line to prevent a deformation or destruction of the bubble at the tip, a high sensitivity pressure sensor is preferably integrated into the gas delivery system downstream of the manifold. The output from this sensor is inputted into a pressure regulator to allow the regulator to open and close in response to pressure changes in the line.

As the AFM tip approaches the surface, the attractive potential between the tip and the surface induces an attractive force that causes the AFM cantilever to bend towards the surface. This attraction can be described with a Lennard Jones potential (LJP). For non-reactive interactions between the tip and surface, the potential between the tip and surface generates an attractive force that has a $R^{-6}$ dependence on the distance between the tip and surface, R. This force is due to van der Waals attractions that exist between two particles.

As the distance decreases, the attraction becomes progressively stronger. When the distance between the tip and the surface approaches the topology of the surface, an even stronger repulsive force affects the deflection of the AFM tip. This force has an $R^{-12}$ repulsive dependence and is the result of hard sphere repulsions between atoms of the tip and atoms on the surface.

Assuming that when the forces at work at the tip are such that that within the tip, there exists the same pressure as the ambient pressure surrounding the sample, the liquid/gas interface will remain at the same level as the liquid outside of the tip. This phenomenon can be quantitatively expressed by way of Bernoulli's equation:

$$P_{ambient} + \tfrac{1}{2}\rho v_{ambient}^2 + \rho g h = P_{inside\ tip} + \tfrac{1}{2}\rho v_{inside\ tip}^2$$

wherein p is the liquid density;

v is the velocity of the gasses in the manifold and tip (0 when stationary);

h is the level of the liquid in the tip; and g is the gravitational constant equal to 9.8 m/sec$^2$.

Thus, since the liquid with density p is stationary, v=0, and the gas pressure equals the ambient pressure, $P_{ambient} = P_{inside\ tip}$, the difference in height between the ambient liquid level and the liquid level in the tip, denoted as h, equals zero. To move the position of the interface is achieved by controlling the pressure of the gas at the tip by using gas manifold 306. If the gas pressure at the tip is increased, the value of h becomes non-zero, resulting in the interface approaching the end of the tip near the surface to be imaged. Therefore, to obtain a bubble at the end of the tip, the operator needs to adjust the pressure as finely as possible to obtain an h value comparable to how far the tip is immersed within the liquid. In real applications, other forces also have an effect on the total pressure needed to move the liquid/gas interface near the AFM tip. One example of a force that affects this position is the surface tension of the liquid. This force only causes the final pressure needed within the gas tip to be higher than what is calculated by Bernoulli's equation.

The advantage of the present invention is its ability to create an expanding gas bubble at the tip of the AFM. With the gas manifold connected to the tip, it becomes possible to create and control all aspects of the gas bubble that is formed by finely adjusting the pressure of the gas in the tip.

When the bubble is formed, the tip then can be slowly moved towards the surface using standard non-contact AFM methodologies. When the maximum force distance between tip and surface is achieved, the tip is adjusted to that position. From that point onward, standard AFM methods can be used to image the surface.

To maintain the pressure in the line that prevents the deformation or the destruction of the bubble at the tip, a high sensitivity pressure sensor is preferably integrated into the gas delivery system downstream of the manifold. The output from this sensor is then inputted into a pressure regulator to allow the regulator to open and close in response to the pressure changes in the line.

While the present invention has been particularly described in conjunction with specific embodiments, it is evident that other alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. An atomic force microscope (AFM) comprising a hollowed flexible lever ending in a hollowed tip, the end of said tip being immersed in a liquid, the AFM comprising a gas source that provides and controls the flow of gas into said hollowed tip, said gas being non-reactive to said liquid, the flow rate of said gas forming and sustaining a bubble at the end of said hollowed tip while said gas is flowing.

2. The AFM as recited in claim 1, wherein the surface of said expanding bubble is subjected to a force exerted by said liquid compressing said bubble and an opposing force of said gas flow expanding said bubble.

3. The AFM as recited in claim 2, wherein at equilibrium, said opposing forces come to a balance, sustaining said bubble in an expanding mode.

4. The AFM as recited in claim 1, wherein said liquid is an inert liquid.

5. The AFM as recited in claim 1, wherein said liquid is mineral oil.

6. The AFM as recited in claim 3, wherein the shape of said bubble is controlled by an optical imaging feedback system.

7. The AFM as recited in claim 6, wherein when said bubble is formed, said optical imaging feedback system captures an image of said bubble, and iteratively compares the original image of said expanding bubble to the image of the bubble as the tip rasters the surface of a sample.

8. The AFM as recited in claim 7, wherein any variation in the shape of said bubble is detected by said optical imaging feedback system which then compensates by increasing or decreasing the flow of gas to return said bubble to said equilibrium condition.

9. The AFM as recited in claim 7, wherein the same pressure exists as the ambient pressure surrounding said sample, and wherein the interface between said liquid to said gas is maintained at the same level as the liquid outside said tip.

10. The AFM as recited in claim 9, wherein said pressure is adjusted to position said bubble at an end of said tip.

11. The AFM as recited in claim 8, wherein a sensitivity pressure sensor is coupled to a gas monitor to maintain pressure in said hollowed flexible lever to prevent deformation or destruction of the said bubble.

12. The AFM as recited in claim 11, wherein an output from said sensitivity pressure sensor is inputted into a pressure regulator to allow said pressure regulator to open and close in response to pressure changes in said hollowed flexible lever.

13. The AFM as recited in claim 11, wherein different gasses are selected when changing samples.

14. A method of forming a expanding gas bubble in an atomic force microscope (AFM) having a hollowed flexible lever comprising the steps of:

providing said hollowed flexible lever with a hollowed tip;

immersing the end of said tip in a liquid; and integrating into said AFM a gas source that provides and controls the flow of gas into said hollowed tip, the flow rate of said gas forming and sustaining bubble at the end of said hollowed tip.

15. The method as recited in claim 14, further comprising the step of controlling the shape of said bubble by an optical imaging feedback system coupled to said AFM.

16. The method as recited in claim 15, wherein said optical imaging feedback system captures a first image of said bubble and iteratively compares said first image of said bubble to a second image of the bubble when said hollowed tip rasters the surface of a sample.

17. The method as recited in claim 16, wherein variations in the shape of said bubble captured by said optical imaging feedback system are compensated by increasing or decreasing the flow of gas to bring said expanding bubble back to an equilibrium condition.

18. The method as recited in claim 15, wherein the surface of said bubble is subjected to a force exerted by said liquid compressing said bubble and an opposing force of said gas flow expanding said bubble.

19. The method as recited in claim 17, wherein at equilibrium, said opposing forces come to balance, sustaining said bubble.

20. The method as recited in claim 15, wherein said liquid is an inert and non-reactive liquid.

* * * * *